US007184418B1

(12) United States Patent
Baba et al.

(10) Patent No.: US 7,184,418 B1
(45) Date of Patent: Feb. 27, 2007

(54) METHOD AND SYSTEM FOR HOST MOBILITY MANAGEMENT PROTOCOL

(75) Inventors: Shinichi Baba, Morristown, NJ (US); Jyh-Cheng Chen, Flanders, NJ (US); Ashutosh Dutta, Lake Hiawatha, NJ (US); Yasuro Shobatake, Morristown, NJ (US); Faramak Vakil, Bedminster, NJ (US)

(73) Assignees: Telcordia Technologies, Inc., Piscataway, NJ (US); Toshiba America Research, Inc., Piscataway, NJ (US)

( * ) Notice: Subject to any disclaimer, the term of this patent is extended or adjusted under 35 U.S.C. 154(b) by 589 days.

(21) Appl. No.: 09/693,019

(22) Filed: Oct. 20, 2000

Related U.S. Application Data

(60) Provisional application No. 60/160,968, filed on Oct. 22, 1999.

(51) Int. Cl.
  H04Q 7/00 (2006.01)
  H04L 12/56 (2006.01)
(52) U.S. Cl. ............... 370/331; 370/389; 370/902; 455/432.1; 455/436
(58) Field of Classification Search ............... 370/331, 370/389, 902, 912; 455/436, 440, 432.1
  See application file for complete search history.

(56) References Cited

U.S. PATENT DOCUMENTS

| 5,822,434 A | 10/1998 | Caronni et al. ............... 380/49 |
| 5,933,784 A * | 8/1999 | Gallagher et al. ........ 455/552.1 |
| 5,956,681 A | 9/1999 | Yamakita ..................... 704/260 |
| 6,038,230 A | 3/2000 | Ofek ........................... 370/389 |
| 6,075,776 A | 6/2000 | Tanimoto et al. ........... 370/254 |
| 6,092,113 A * | 7/2000 | Maeshima et al. .......... 709/230 |

(Continued)

OTHER PUBLICATIONS

Sengodan et al.; Method of Pre-Authorizing Handovers Among Access Routers in Communication Networks; May, 15, 2003; United States Patent Application Publication.*

(Continued)

*Primary Examiner*—Chi Pham
*Assistant Examiner*—Tri H. Phan
(74) *Attorney, Agent, or Firm*—Joseph Giordano; Jim Falk

(57) ABSTRACT

The present invention is directed to a mobility management protocol for supporting real-time and non-real-time multimedia applications on mobile stations of third generation internet protocol (3G-IP) networks. The present invention utilizes as well as extends the session initiation protocol (SIP) to provide for domain hand-off (i.e., roaming) and subnet hand-off (i.e., macro-mobility) so that users can access the network from any location using their own mobile station as they roam across different 3G-IP networks. The present invention supports mobile transmission control protocol (TCP) applications without modifying TCP. More specifically, disclosed herein is: a novel use of the SIP INVITE method for IP address binding; a novel use of the SIP INFO method to provide a means of profile verification and IP address binding; a novel use of the SIP REGISTER method to allow a SIP registrar to obtain a new IP address from a Dynamic Host Configuration Protocol (DHCP) server on behalf of the mobile; and an inventive entity called a SIP_EYE Agent that maintains a record of ongoing TCP connections and releases within the mobile.

1 Claim, 12 Drawing Sheets

U.S. PATENT DOCUMENTS

| | | | |
|---|---|---|---|
| 6,122,665 A | 9/2000 | Bar et al. | 709/224 |
| 6,161,008 A | 12/2000 | Lee et al. | 455/414 |
| 6,266,405 B1 * | 7/2001 | Madour et al. | 379/220.01 |
| 6,272,522 B1 * | 8/2001 | Lin et al. | 709/200 |
| 6,434,134 B1 * | 8/2002 | La Porta et al. | 370/338 |
| 6,453,034 B1 * | 9/2002 | Donovan et al. | 379/220.01 |
| 6,519,242 B1 * | 2/2003 | Emery et al. | 370/338 |
| 6,539,237 B1 * | 3/2003 | Sayers et al. | 455/555 |
| 6,567,664 B1 * | 5/2003 | Bergenwall et al. | 455/403 |
| 6,697,354 B1 * | 2/2004 | Borella et al. | 370/352 |
| 6,707,809 B1 * | 3/2004 | Warrier et al. | 370/351 |
| 6,721,806 B2 * | 4/2004 | Boyd et al. | 719/312 |
| 6,842,447 B1 * | 1/2005 | Cannon | 370/352 |

OTHER PUBLICATIONS

Isomaki et al.; Communication System and Method to be Performed in a Communication System; Sep. 25, 2003; United States Patent Application Publication.*

Mobile Internet telephony protocol; an application layer protocol for mobile Internet telephony services; Wanjiun Liao; Communications, 1999. ICC '99. 1999 IEEE International Conference on, vol. 1, Jun. 6-10, 1999; pp. 339-343.*

Mobile IP telephony: mobility support of SIP; Moh, M.; Berquin, G.; Yanjun Chen; Computer Communications and Networks, 1999. Proceedings. Eight International Conference on, Oct. 11-13, 1999, pp. 554-559.*

* cited by examiner

METHOD AND SYSTEM FOR HOST MOBILITY MANAGEMENT PROTOCOL

RELATED UNITED STATES APPLICATIONS/CLAIM OF PRIORITY

This patent application is a non-provisional counterpart to, and claims the benefit of priority of provisional application Ser. No. 60/160,968, which was filed on Oct. 22, 1999 and entitled Method and System for Host Mobility Management Protocol.

FIELD OF THE INVENTION

The present invention relates generally to networks and more specifically to a mobility management protocol for supporting real-time and non-real-time multimedia services on an end-to-end wireless/wireline Internet Protocol (IP) network that uses third generation wireless systems/technologies. Hereinafter, such a wireless network will also be referred to as a 3G-IP network.

Glossary

This glossary contains terms used in this specification. The terms and their associated definitions are derived from the following Internet Engineering Task Force Memos and/or Requests for Comments (RFC): SIP: Session Internet: protocol (RFC 2443); The SIP INFO Method; SDP: Session Description Protocol (RFC 2131); IP Encapsulation within IP (RFC 2003); and Minimal Encapsulating within IP (RFC 2004). Each of the foregoing documents is incorporated herein in its entirety by reference. The reader is urged to look to this glossary if any term used in the specification is unclear. The reader is also encouraged to reference the appropriate RFC or Memo for a more detailed explanation of all terms used herein.

Client: an application program that sends SIP requests. Clients may or may not interact directly with a human user. User agents and proxies contain clients (and servers).

CONTACT: a field in the header of SIP request or response messages. The REGISTER request message may contain a CONTACT header field; future non-REGISTER requests for the URL given in the To header field should be directed to the IP address(es) given in the CONTACT header field. If a REGISTER request message does not contain a CONTACT header, the registration remains unchanged.

Dynamic Host Configuration Protocol (DHCP): a protocol that provides a means to dynamically allocate IP addresses to computers on a local area network. The system administrator assigns one or more IP addresses to a DHCP server and each client computer on the LAN has its TCP/IP software configured to request an IP address from the DHCP server. The request and grant process uses a lease concept with a controllable time period.

DHCPDISCOVER: a client broadcast message to locate available DHCP servers.

DHCPOFFER: a message from a DHCP server to a client in response to a DHCPDISCOVER message with and offer of configuration parameters.

DHCPREQUEST: a client message to DHCP servers either (a) requesting offered parameters from one server and implicitly declining offers from all others, (b) confirming correctness of previously allocated IP address after, e.g., system reboot, or (c) extending the lease on a particular network IP address.

DHCPACK: a message from a DHCP server to a client with configuration parameters, including committed network IP address.

Domain Name System, DNS: a distributed Internet directory service. DNS is used mainly to translate between domain names and IP addresses, and to facilitate Internet services (e.g., email delivery.) Most Internet services rely on DNS to work, and if DNS fails, the Internet services also fail (e.g. web sites cannot be located and email delivery stalls.)

INVITE, Invitation: a SIP request sent to a user (or service) requesting participation in a session. A successful SIP invitation consists of two transactions: an INVITE request followed by an ACK (acknowledgement) request.

Proxy, proxy server: an intermediary program that acts as both a server and a client for the purpose of making requests on behalf of other clients. Requests are serviced internally or by passing them on, possibly after translation, to other servers. A proxy interprets, and, if necessary, rewrites a request message before forwarding it.

Redirect server: a server that accepts a SIP request, maps the IP address into zero or more new addresses and returns these addresses to the client. Unlike a proxy server, it does not initiate its own SIP request. Unlike a user agent server, it does not accept calls.

Registrar: a server that accepts REGISTER requests. A registrar is typically co-located with a proxy or redirect server and may offer location services.

SIP REGISTER method: a method that allows a client to let a SIP Proxy or Redirect server know at which IP address it can be reached.

SIP INFO method: a method for communicating mid-session signaling information along the signaling path of a call. An INFO message carries application level information (session related control information generated during a session) along the SIP signaling path.

Server: a server is an application program that accepts requests in order to service requests and sends back responses to those requests. Servers are either proxy, redirect or user agent servers or registrars.

Session: a multimedia session is a set of multimedia senders and receivers and the data streams flowing from senders to receivers.

User Agent Client: a user agent client is a client application that initiates SIP requests.

User Agent Server: a user agent server is a server application that contacts the user when a SIP request is received and that returns a response on behalf of the user. The response accepts, rejects or redirects the request.

User Agent: an application which contains both a user agent client and user agent server. An application program may be capable of acting both as a client and a server. For example, a typical multimedia conference control application would act as a user agent client to initiate calls or to invite others to conferences and as a user agent server to accept invitations.

User Datagram Protocol (UDP): an Internet standard network layer, transport layer and session layer protocols which provide datagram services. UDP is a connectionless protocol which, like TCP, is layered on top of IP.

User or personal mobility: In a network, the ability of a user to access telecommunication services at any terminal on the basis of a personal identifier and the ability of the network to locate the terminal associated with the user to provide the user with the requested telecommunication services.

Terminal mobility: In a network, the ability of a terminal to access telecommunication services from different locations within the network and the ability of the network to identify and locate that terminal.

Transmission Control Protocol (TCP): the most common transport layer protocol used on Ethernet and the Internet. TCP is built on top of the Internet Protocol (IP). TCP is connection-oriented and stream-oriented, as opposed to User Datagram Protocol.

BACKGROUND

Driving the trend towards 3G-IP wireless networks are users' demand for perpetual ubiquitous access to the Internet, rapid proliferation of mobile Internet units, and providers' desire for deploying a flexible wireless and wireline IP platform that supports heterogeneous services economically. Furthermore, the current wisdom is that the existing circuit-switched and first and second generation (1G/2G) wireless systems will eventually evolve and merge into an end-to-end IP platform that provides ubiquitous real-time (e.g., voice, video) as well as non-real-time (e.g., email) services. In a nutshell, it is envisioned that an end-to-end wireless/wireline IP platform comprising 3G wireless access networks and a wireline IP backbone will support real-time and non-real-time multimedia services in the future. Thus, supporting roaming users is an essential feature of the end-to-end signaling and control system of IP networks.

A 3G-IP network is a wireless platform that enables a mobile user's IP compliant terminal to access multimedia services on the network. The network is 1) built upon the packet mode capabilities of the 3G wireless technologies; 2) supports mobile real-time and non-real-time services such as mobile telephony, mobile web access, and mobile data services; 3) provides means of global roaming; 4) offers intelligent services (e.g., call forwarding, etc.) similar to those of today's intelligent networks; 5) strives to ensure that the quality (and price) of their service offerings will be comparable to those of today's wireless telephony and data services; and 6) is built upon enhancements of the current Internet Engineering Task Force (IETF) standards to the extent possible so that the design and development cycle is minimized.

Among the key issues in the design of the signaling and control system of 3G-IP networks are how to 1) support terminal as well as personal (i.e. user mobility; 2) satisfy the quality of service (QoS) requirements of services, particularly those of real-time applications for roaming users; 3) ensure privacy and security of the users as well as the network resources; 4) perform billing and accounting; and 5) maintain smooth interworking with the public switched telephone network (PSTN) and its 1G/2G wireless access networks.

The Session Initiation Protocol (SIP) is a protocol for set-up and termination of multimedia as well as telephone sessions on the Internet. A SIP address is similar to an e-mail address. It identifies a user as user@host, where the "user" is a user name and the "host" is a domain name. SIP provides several methods (or messages) and responses for session control by SIP entities.

SIP provides a means is of signaling for supporting internet telephony and multicast multimedia conferences on the Internet. It uses a number of methods to initiate signaling tasks and a number of responses to indicate the success or failure. SIP methods include INVITE, REGISTER, ACK, BYE, CANCEL, OPTIONS, and INFO. SIP responses are distinguished by status codes. For instance, 1xx responses are used for progress update. 2xx codes for success, 3xx for redirection, 4xx for request failure, etc.

SIP has three entities, user agents, proxy servers and redirect servers. The SIP user agent sends SDIP messages upon user's request, receives and handles SIP messages from other SIP entities, and starts applications as necessary. A SIP proxy server relays SIP messages across the network using the domain name, while a SIP redirect server returns the location of the host rather than relaying the SIP message. Both SIP proxy and redirect servers accept registration requests containing the current locations of users from users (i.e., SIP user agents). The location can be stored either locally at the SIP server or at a dedicated location server, referred to as a SIP register. This registration process enables the network to locate users even if they change their locations.

In its simplest form, SIP sets up a typical session or telephone call as follows:
(1) A caller's user agent sends a SIP INVITE message containing a session description (using the session description protocol) directly to a callee's user agent to invite him/her to participate in a session.
(2) The callee's agent sends back an OK message, i.e. 200OK message, to the caller's user agent to accept the invitation along with the acceptable session description.
(3) Upon receipt of the OK message, the caller's user agent sends an acknowledge message, i.e. ACK message, to the callee's user agent to confirm the session set up, and
(4) After confirmation of session setup, data transfer (i.e., the conversation) begins:

If a caller's user agent utilizes a middleman, i.e. a SIP proxy server, the proxy server forwards the INVITE message to other proxy servers until it arrives at the callee's user agent, and when necessary, the SIP redirect servers locate the callee for a SIP user agent or a SIP proxy so that the INVITE message is forwarded to the appropriate callee's user agent.

SIP is advantageous because: 1) SIP is a lightweight end-to-end protocol with a small set of messages that can be used for user as well as network node signaling; 2) SIP uses a single request message for session initiation, and scales well over wide area networks; 3) SIP is more suitable for IP mobiles, enables mobiles to perform some intelligent networking functions themselves, and supports non-IP mobiles via a customer gateway; and 4) SIP provides a means of personal mobility that is a crucial part of mobility management in wireless environments.

However, despite its advantages, SIP itself does not provide a means for terminal mobility, which is also a critical part of mobility management in wireless environments. That is, a mobile SIP user cannot use his/her mobile terminal to communicate or maintain a current communication connection while roaming among networks.

SUMMARY

The present invention utilizes SIP in a unique way to provide for terminal mobility, thus, enabling 1) the end user to use his/her mobile terminal/unit in any location to originate and receive calls and access a subscribed network in a transparent manner and 2) the network to maintain the user's ongoing communication as she/he roams across (radio) cells within the same subnet, and subnets within the same or different administrative domains. The present invention advantageously supports terminal mobility without the need for any special element within the network.

Therefore, in accordance with one aspect of the present invention, there is provided a system, method and product for providing mobility support from a first IP network environment to a second IP network environment, comprising: assigning a personal identifier to a mobile user; associating the personal identifier to a mobile station; associating a first temporary IP address from the first environment with the personal identifier; receiving packets of data at the mobile station from a corresponding host wherein each of the packets of data further comprises a source IP address and a destination IP address, the destination IP address being the first temporary IP address and the source IP address being the IP address associated with the corresponding host; monitoring the mobile station to sense movement of the mobile station from the first environment to the second environment; associating a second temporary IP address from the second environment with the personal identifier; forwarding to the second temporary IP address packets of data having the first temporary IP address as the destination IP address; sending the second temporary IP address to the source IP address; and discontinuing forwarding of packets of data having the first temporary IP address as the destination IP address to the second temporary IP address.

In accordance with a second aspect of the present invention there is provided, in a third generation end-to-end wireless/wire-line IP network adapted to support mobility including a corresponding host node in a first SIP-compliant network environment, a system, method and product for forwarding transient data packets addressed to a mobile node from the corresponding host node, the mobile node having traveled from the first SIP-compliant network environment to a second SIP-compliant network environment, the method comprising: re-inviting the corresponding host node to the mobile node using SIP INVITE, creating a short lived tunnel between a first edge router and controller located within the first SIP-compliant network environment and a second edge router and controller located within the second SIP-compliant network environment using SIP INFO; forwarding the transient data packets to the mobile node via the tunnel; and discontinuing the forwarding of the data packets to the mobile node after a brief time-out period.

In accordance with a third aspect of the present invention there is provided, for use in a SIP-compliant network having a plurality of nodes, a SIP-EYE Agent The SIP-EYE Agent maintains a record of each of the ongoing connections, each record having associated therewith an original IP address of the mobile station, a previous IP address of the mobile station, a current IP address of the mobile station, and an original IP address of the corresponding host node; wherein the original IP address of the mobile station is the IP address of the mobile station at the beginning of the TCP connection, the previous IP address of the mobile station is the last IP address of the mobile station just before the current IP address of the mobile station, and the original IP address of the corresponding host node is the IP address of the corresponding host at the beginning of the TCP connection.

In accordance with a fourth aspect of the present invention there is provided, in a SIP-compliant network having a plurality of nodes, a system, method and product for reducing the time a mobile node takes to register and configure in a visiting environment when a mobile node travels from a first environment to the visiting network environment, comprising adding a registration/handoff option to the SIP REGISTER method, equipping a SIP registrar node with a DHCP client node and co locating the SIP registrar node with a DHCP server node to enable the SIP registrar node to assign an IP address to the mobile node thereby reducing IP address acquisition time.

In accordance with a fifth aspect of the present invention there is provided, in a SIP-compliant network having a plurality of nodes, a system, method, and product for reducing the time a mobile node takes to register and configure in a visiting environment when a mobile node travels from a first environment to the visiting network environment, further comprising replicating a profile of the mobile node in the visiting environment to reduce the authentication time of the mobile node.

In accordance with a sixth aspect of the present invention there is provided, in a SIP-compliant network having a plurality of nodes, a system, method and product to support IP address binding within the network, comprising augmenting a SIP INFO message with an instruction to bind a first IP address to a second IP address.

These and other aspects, features and advantages of the present invention will become better understood with regard to the following description, appended claims, and accompanying drawings.

BRIEF DESCRIPTION OF THE DRAWING(S)

Turning now to the drawings.

Figure 8A:
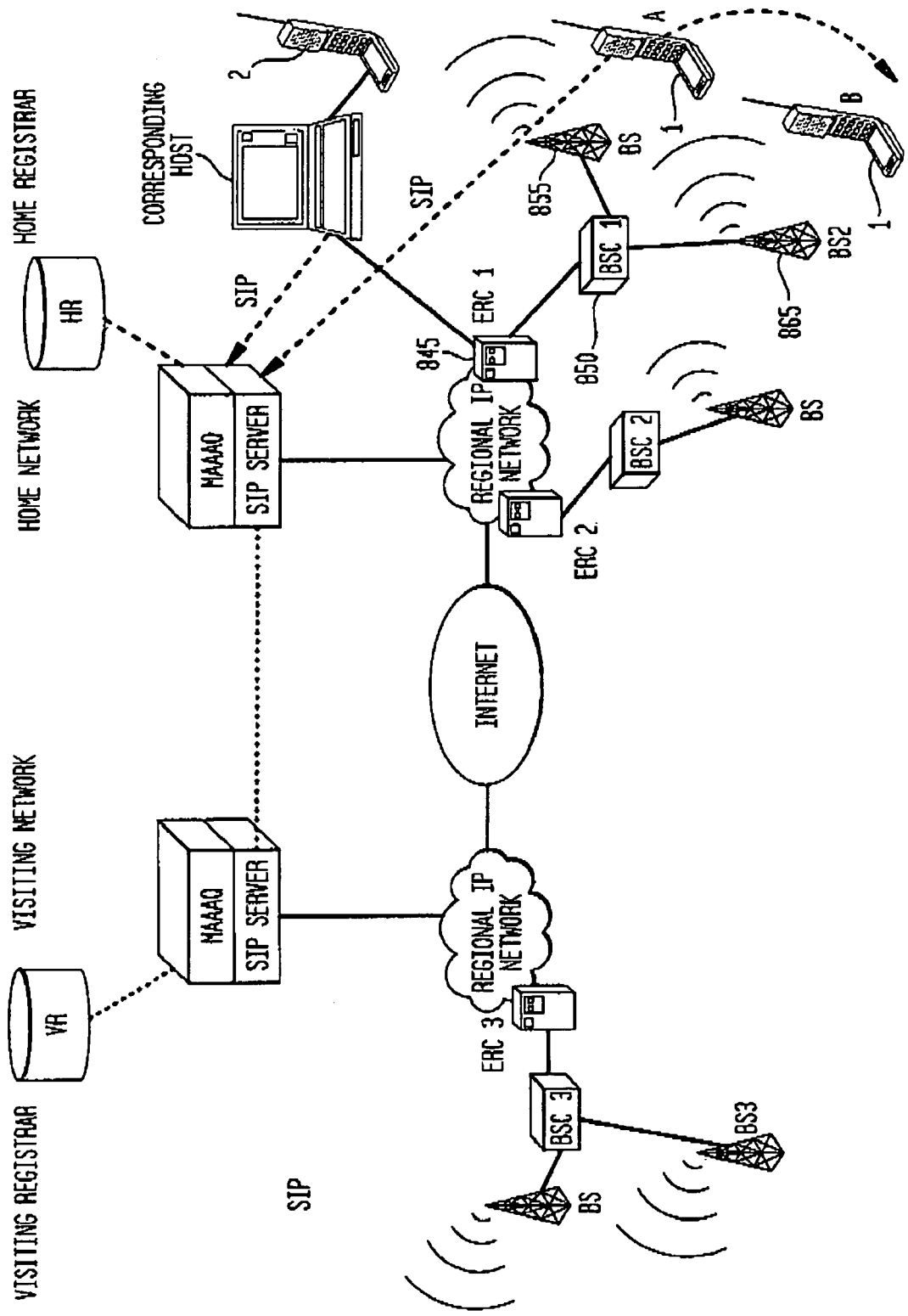
Figure 8B:
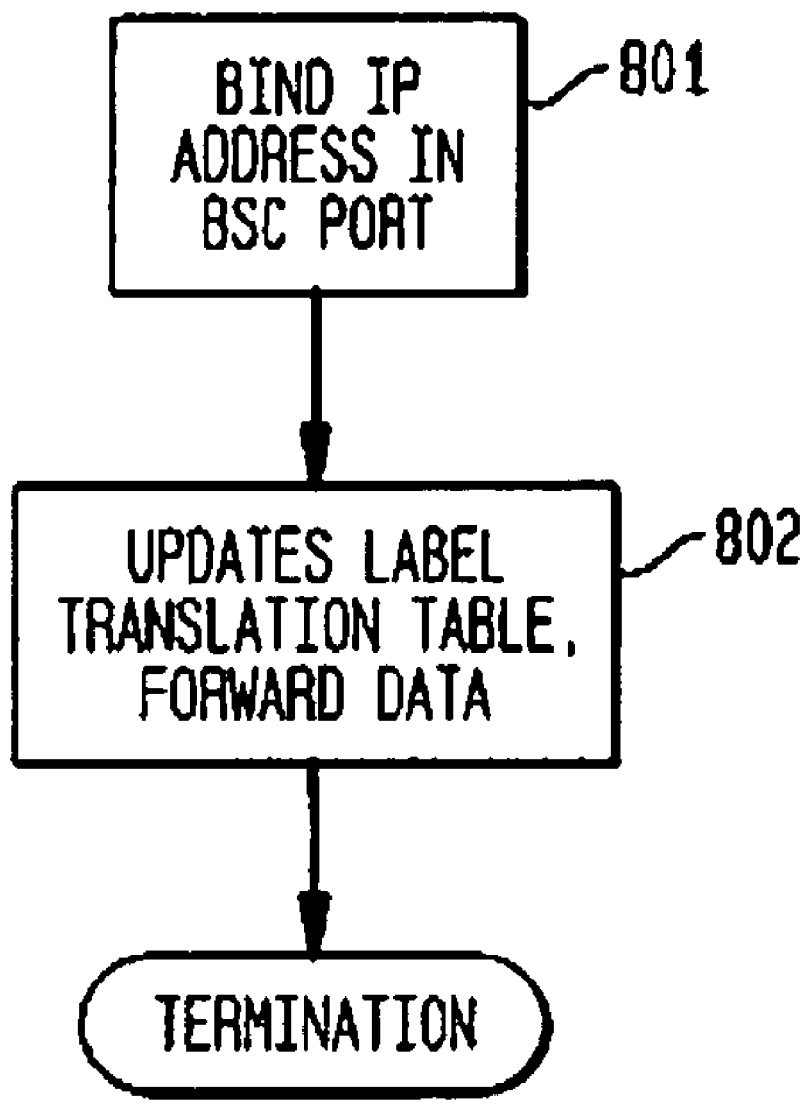

FIG. 8 A illustrates the movement of a mobile station during cell hand-off and FIG. 8B illustrates the logical sequence of operations of cell hand-off performed by the preferred embodiment of the present invention.

Figure 9A:
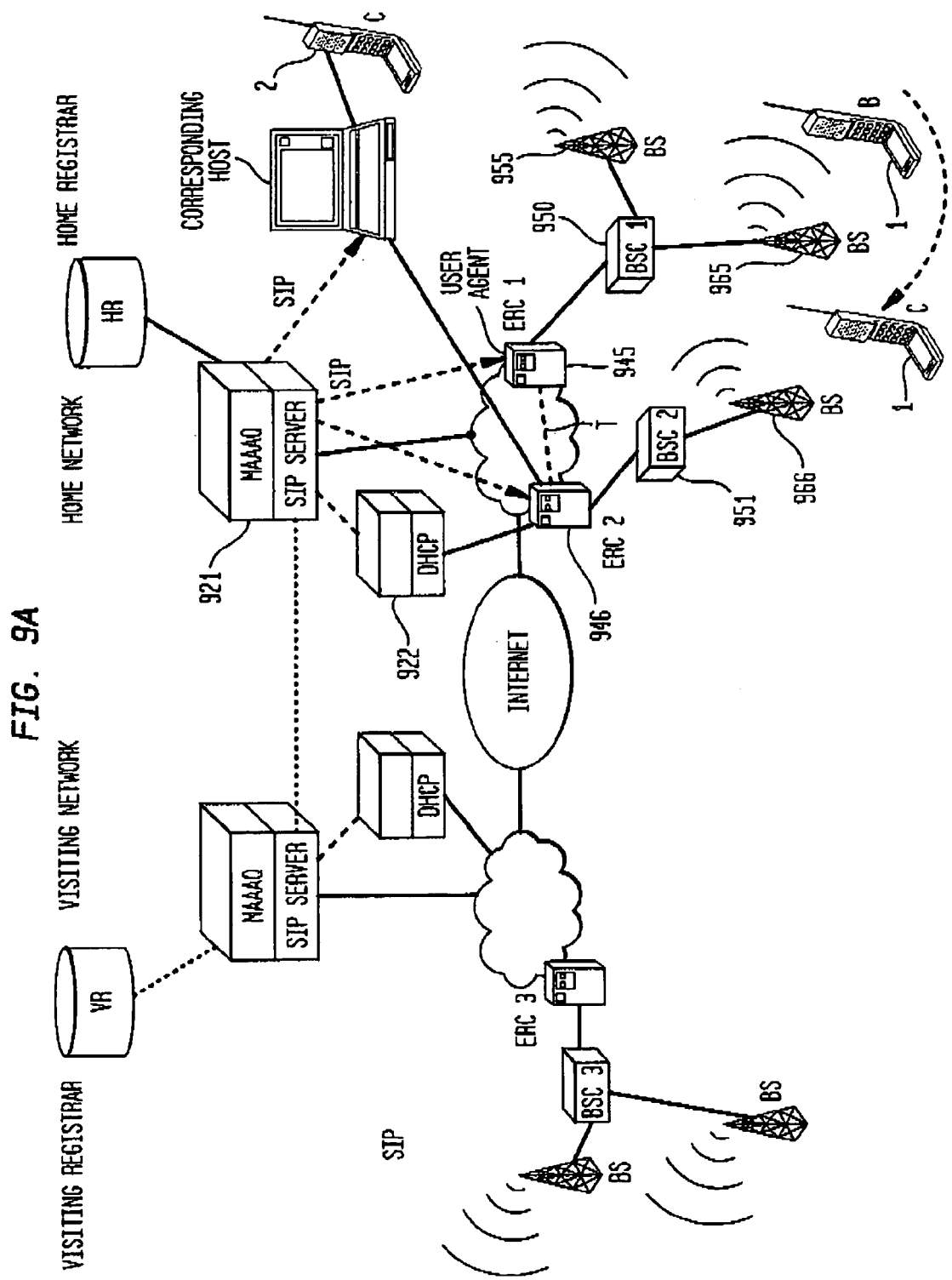

FIG. 9 A illustrates the movement of a mobile station during subnet hand-off and FIG. 9 illustrates the logical sequence of operations of subnet hand-off performed by the preferred embodiment of the present invention.

Figure 10A:
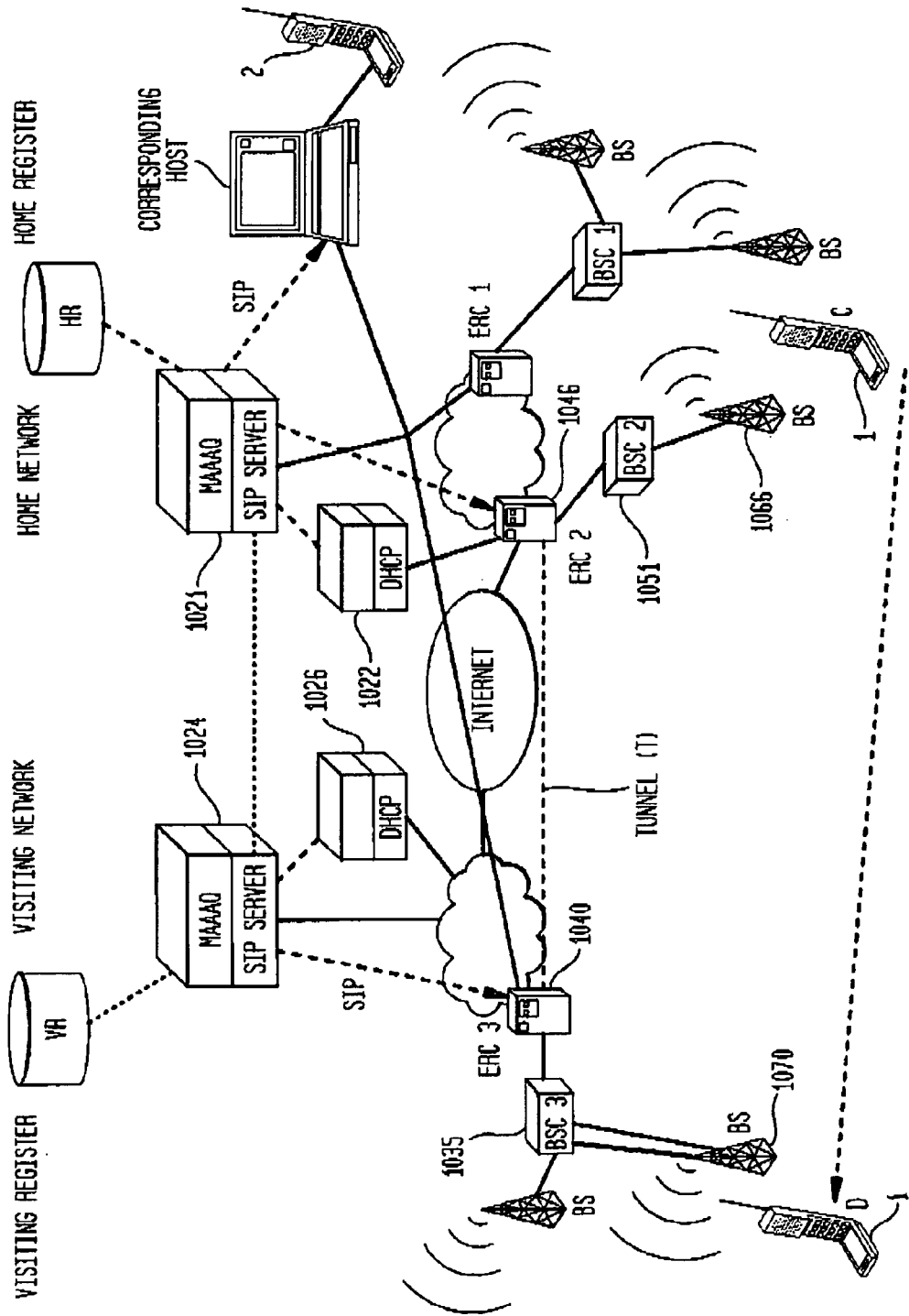

FIG. 10 A illustrates the movement of a user during domain hand-off (roaming) and FIG. 10 B illustrates the logical sequence of operations of domain hand-off (roaming) performed by the preferred embodiment of the present invention.

DETAILED DESCRIPTION

Referring more specifically to the drawings, for illustrative purposes the present invention is embodied in the system configuration, method of operation and product or computer-readable medium such as floppy disks, conventional hard disks, CD-ROMS, Flash ROMS, nonvolatile ROM, RAM and any other equivalent computer memory device, generally shown in FIGS. 1–10. It will be appreciated that the system, method of operation and product may vary as to the details of its configuration and operation without departing from the basic concepts as disclosed herein.

What follows is a brief overview of an end-to-end wireless/wireline 3G-IP network and its signaling architecture that serves as the foundation of the present invention.

Figure 1:
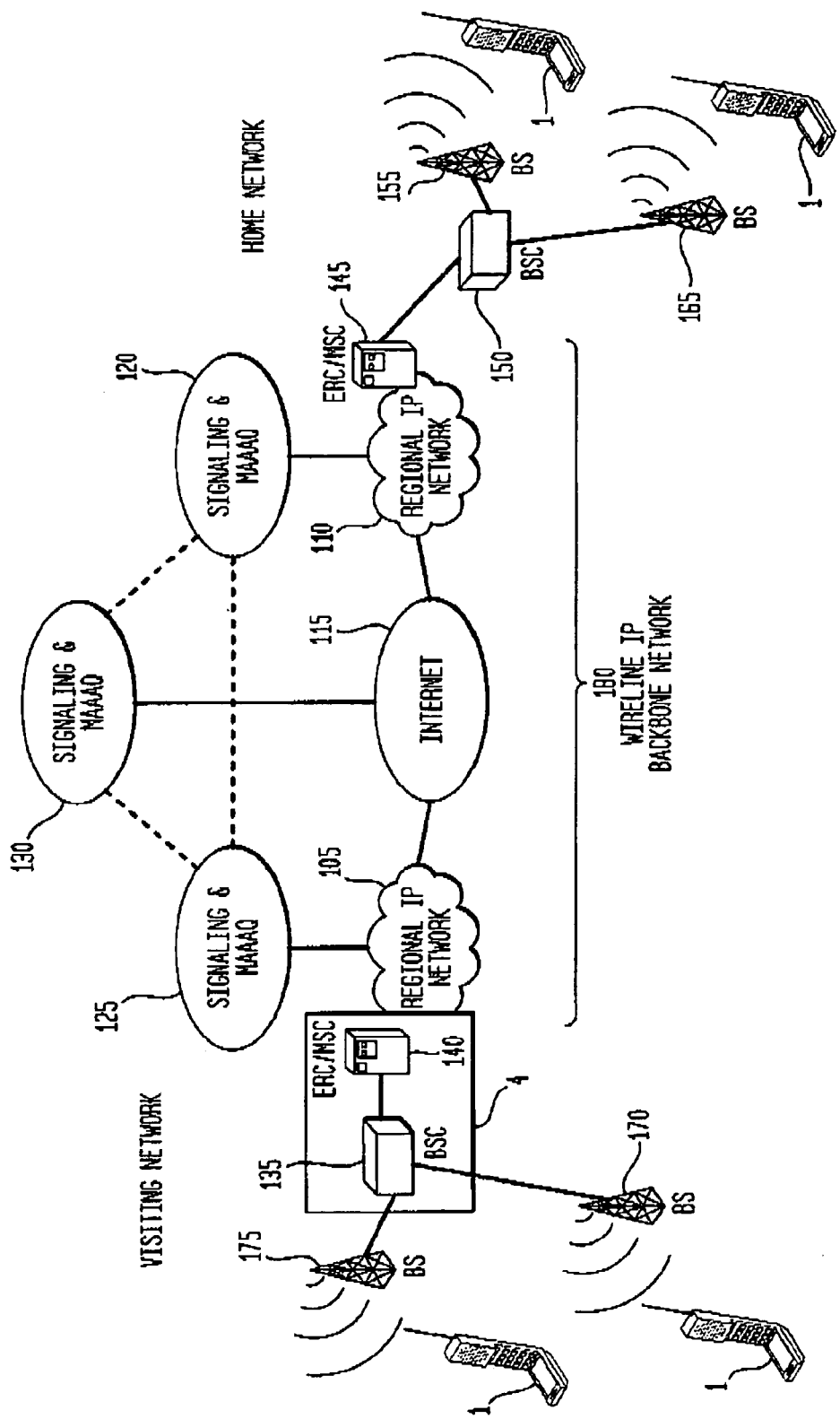
FIG. 1 is a network architecture diagram of a 3G-IP network.

FIG. 1 illustrates the architecture of an 3G-IP network having a plurality of wireless access networks (at least two are shown in FIG. 1) and a packet-switched wireline IP backbone network. The wireless access network typically includes various mobile stations/terminals 1; base stations 155,165,170,175; base station controllers 135, 150; signaling and MAAAQ entities 120, 125, 130; and edge routers and controllers (ERCs) or mobile switching centers (MSCs) 140,145; positioned throughout the network landscape. The packet switched IP backbone network 180 is an end-to-end wireline IP infrastructure that includes the IP networks of various regional wireline providers 105, 110 connected to one another by the Internet 115.

A mobile station (MS) is a user's mobile terminal that allows the user to communicate. It also allows the mobile user to interact (i.e., signaling) with the network itself and with other mobile users.

A base station (BS) is an adaptive remote radio multiplexer/demultiplexer that provides physical and link layer functions and essentially serves as a MAC layer repeater. For example, programmable software radios can be used to provide flexibility across frequency bands at the mobile station and the base station.

A base station controller (BSC) is a multi-port bridge (or switch) within an IP interface to an edge router and controller that interacts with the network control and management system, via the edge router and controller, to control and manage base stations. A single base station controller may control one or more base stations. Within the base station controller is a label translation table that binds the mobile station's hardware or MAC addresses to the appropriate ports of the base station controller.

An edge router and controller (ERC) is an IP router that connects the wireless access network and the regional wireline IP network. In IP parlance, each edge router and controller is the default gateway of all IP mobile stations that are supported by the base station controller that are connected to it. Furthermore, it is worth noting that the functions of a base station controller and the functions of an edge router and controller may be implemented either in a single physical entity (shown as a dotted rectangle in FIG. 1), or as two separate entities.

Signaling & MAAAQ entities provide connection management as well as means of interaction between users and network control system and interaction among network control entities. MAAAQ (Mobility, Authentication, Authorization, Accounting, and QoS) entities support mobility management, AAA, and QoS management functions for mobile users. These functional entities usually reside on the wireline backbone, and are part of the overall signaling and control system of the end-to-end platform. As FIG. 1 indicates, the home and visiting Signaling & MAAAQ Entities may either interact directly or via a third party Signaling & MAAAQ Entity on the Internet. In the latter case, the third party Signaling & MAAAQ Entity acts as a trusted broker between the Home and Visiting network Signaling and MAAAQ Entities.

Figure 2:
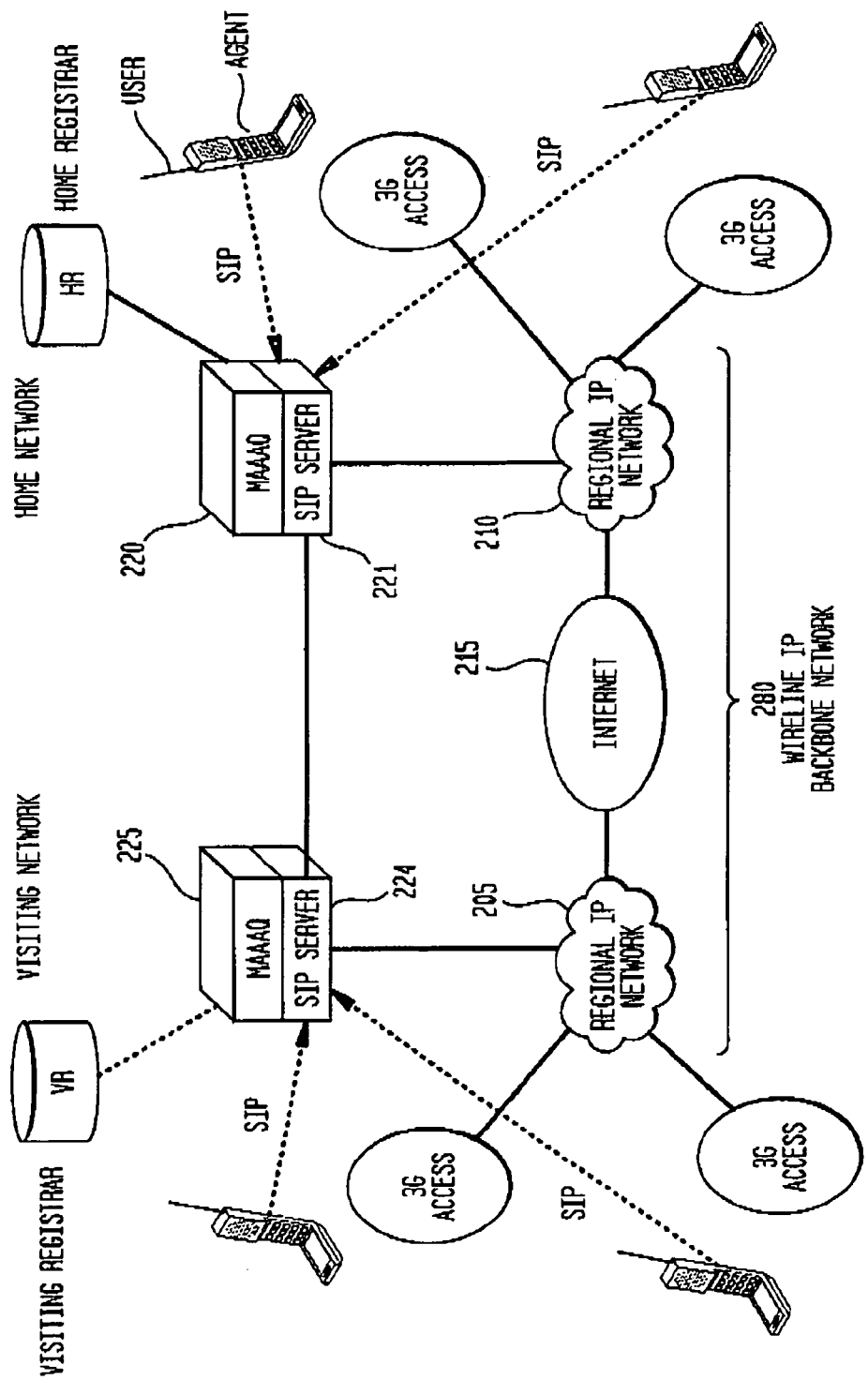
FIG. 2 is a signaling architecture diagram of a 3G-IP network.

FIG. 2 illustrates the overall signaling architecture of the end-to-end wireless/wireline 3G-IP network of FIG. 1 where the session initiation protocol (SIP) is the end-to-end signaling and control protocol used therein.

Assigned to each mobile station, corresponding host and edge router and controller is a SIP User Agent that interacts with the various SIP servers within a network. The overall SIP server 221, 224 of a particular regional IP network 205, 210 includes a set of Proxy Servers, Redirect Servers, and Registrars. The Proxy and Redirect Servers of the regional IP network perform the network control and signaling functions for the regional network. Like the Home/Visiting Location Registry (HLR/VLR) in today's wireless telephony, the Registrar represents the server (or set of servers) that accept(s) register requests (via the SIP REGISTER method) and provide(s) location services for the mobile station. The MAAAQ Entity 220, 225 is built on top of SIP and uses the location and signaling services of the SIP servers to support roaming users. It should be noted that the illustration of the MAAAQ entities and SIP server as a single module shall not be interpreted as a requirement for having a centralized SIP server or MAAAQ entity per regional network. FIG. 2 only shows the required functions, though each of the SIP and MAAAQ entities comprise a set of distributed agents.

With the forgoing overview as backdrop, the discussion will now turn to the specifics of the present invention. The functions and requirements needed to support mobility in IP-based networks vary, depending on the application characteristics, the type of network, and the type of movement. However, essential functions include: Registration and Configuration, and Dynamic Address Binding.

Because many Internet applications that require a reliable service for the transport mechanism, e.g., the file transfer protocol (FTP), primarily use TCP, it is essential that TCP applications are supported by the present invention without the need to modify TCP. Registration allows roaming users to rapidly and automatically register their presence and requirements within networks. Configuration allows networks to automatically configure roaming users to the particular network characteristics. Dynamic Address Binding or alternatively stated, Mobility Support, allows a corresponding host to locate a roaming user and to allow continuous communication as the roaming user moves among networks.

Supporting TCP Applications

The present invention can spoof constant end points for mobile TCP connections and support mobile TCP applications without modifying TCP.

Although the fundamental abstraction of both SIP and TCP is the connection, they each identify it differently. A session/call ID identifies a SIP connection/session, while a pair of endpoints identifies a TCP connection. The TCP endpoint comprise a pair of integers (host, port) where the host is the IP address of the endpoint, and port is the TCP port on the host. As a mobile station roams, its IP address, i.e., the host integer of its TCP endpoint, changes. In order to support TCP applications properly, the present invention shall spoof constant TCP endpoints despite changes in their host integers (i.e., IP addresses) due to roaming. The spoofing process entails the following: 1) a mobile station informs a corresponding TCP host(s) about its new IP address, 2) the corresponding host(s) binds the initial (old) IP address of the mobile station with the new/temporary IP address assigned to the mobile station, and 3) the corresponding host(s) uses IP encapsulation to send any TCP packets that bear the initial source and destination IP address to the current location/IP address of the mobile station.

Figure 3:
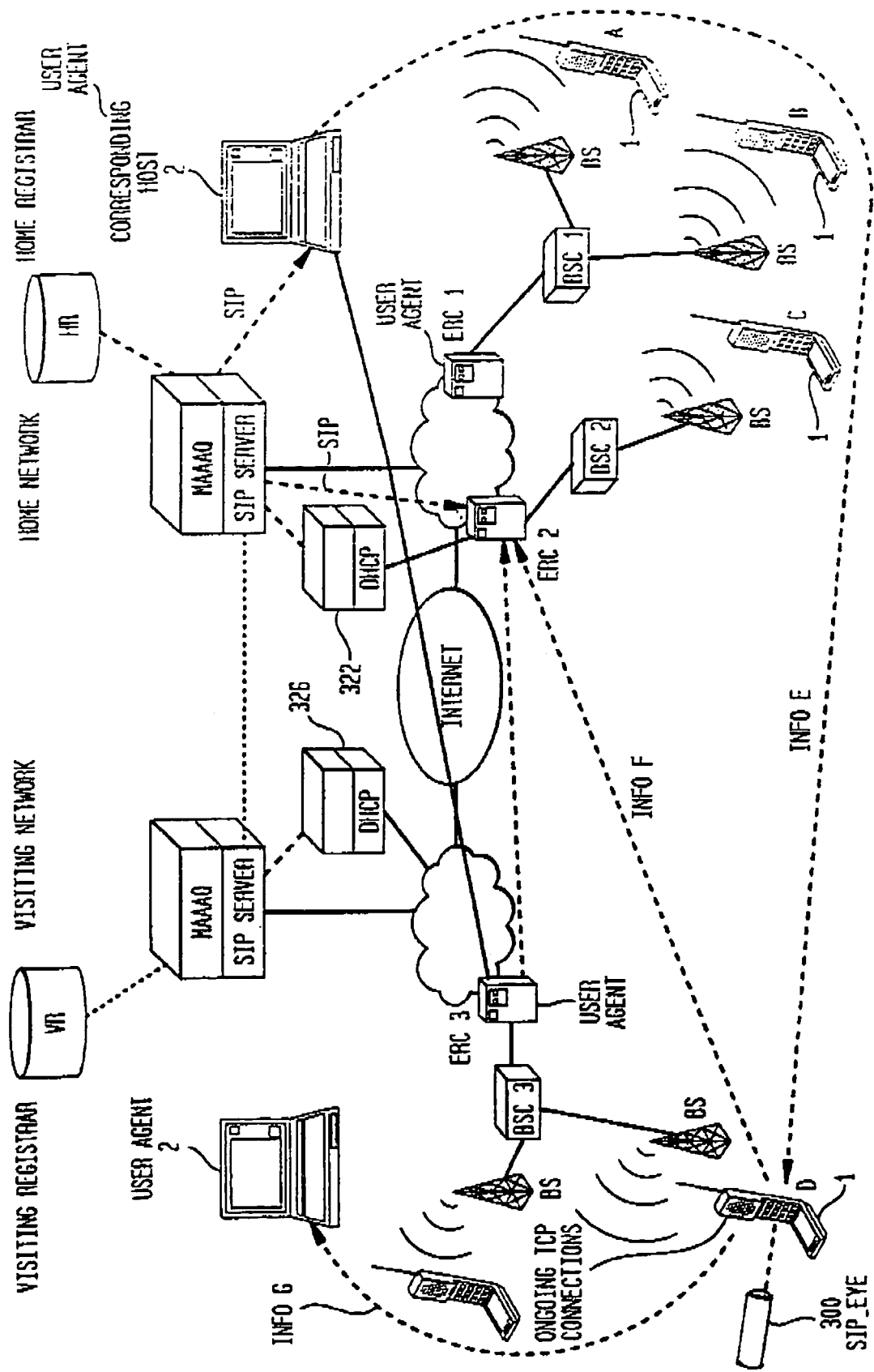
FIG. 3 illustrates how the preferred embodiment of the present invention supports TCP applications.

Preferably, the forgoing process can be implemented by an inventive entity that resides within the mobile station, hereinafter referred to as a SIP-EYE Agent 300, that tracks TCP connection set ups and releases within the mobile station, See FIG. 3. The SIP-EYE Agent 300 enables a SIP User Agent to maintain a record of the mobile station's ongoing TCP connections and their associated identifiers. The whole premise of the SIP-EYE Agent 300 is to ensure that the present invention supports TCP as is without any modifications to TCP. The SIP-EYE Agent 300 is thus a simple TCP tracking/monitoring agent with a small foot print residing within the SIP User Agent of a mobile station and a corresponding host.

Generally stated, the function of the SIP_EYE Agent 300 is to: 1) Identify and track ongoing TCP connections of a mobile station, 2) Instruct the corresponding host(s) to bind the original IP address of the mobile station with the current IP address of the mobile station, and 3) Instruct the previous edge router and controller to bind the previous IP address of the mobile station with the current IP address of the mobile station. With respect to item 1 above, the SIP_EYE Agent tracks both the transmitted and received data TCP packets to create and update the list of ongoing TCP connections within the mobile station. It runs two concurrent monitoring and updating processes, one for tracking the transmitted packets, and the other for tracking the received ones. With respect to items 2 and 3 above, the SIP_EYE Agent plays a significant role in hand-off of TCP connections. This role has already been previously discussed in a prior section of the specification.

Specifically, the primary functions of the SIP_EYE Agent 300 include: 1) examining the headers of TCP packets to monitor the birth and death of TCP connections within the mobile station 1 as well as identify their endpoints, i.e., the source and destination IP addresses and port numbers of these connections; 2) maintaining a current record of the mobile station's ongoing TCP connections' identifiers, and the IP address of the current and last (i.e., most recent) edge router and controller (i.e., default gateways) within the mobile station's SIP User Agent. The SIP_EYE Agent records a state comprising four integers, <original mobile IP address, previous mobile IP address, current mobile IP address, original corresponding host IP address>, per TCP connection. The original IP address is the IP address of the mobile station at the beginning of the TCP session, the previous mobile IP address is the last IP address of the mobile station just before its current one, the current mobile IP address is the current IP address of the mobile and the original corresponding host IP address is the IP address of the corresponding host at the beginning of the TCP session; and 3) upon a mobile station's successful registration with a Visiting Network, sending a first INFO message (or set of messages) to the SIP_EYE Agent(s) of a corresponding host(s) requesting address binding of the original IP address of the mobile station to its current one, and a second INFO message to the previous edge router and controller requesting address binding of the previous host IP address to the new one. Thereafter, a short-lived tunnel is created specifically for the forwarding of transient data packets to the mobile station's current location. Thereafter, the corresponding host and the edge router and controller use IP encapsulation to forward the data packets to the mobile station's current location. The previous ERC discontinues forwarding of packets to the mobile station's current location after a certain time-out period.

The key advantage of this approach is that TCP stays as is, i.e. no modifications to TCP were necessary. Since the DHCP entities/host are expected to interact with DNS to dynamically update the name to IP address and IP address to name mappings, new TCP connections will be established using the current IP address of the mobile station.

The following pseudo-code describes the basic TCP tracking operation of the SIP_EYE Agent 300.

//SA: Source IP address of a packet.

//DA: Destination IP address of a packet.

//SYN: Synchronization bit.

//ACK: Acknowledgement field.

//FIN: Sender end of byte stream.

//The TX SIP_EYE Entity.

for(;;) {

Capture the header of transmitted TCP packets

IF (SYN=1 & ACK=0) {

Add a TCP entry as follows to a temporary label list;

original mobile IP address=SA;

previous mobile IP address=SA;

current mobile IP address=SA;

original corresponding IP address=DA;

} else if (SYN=1 & ACK=1){

Move the TCP entry, original mobile IP address=DA;

previous mobile IP address=DA;

current mobile IP address=DA;

original corresponding IP address=SA;

from the temporary label list to ongoing TCP connections list.

If such an entry does not exist in temporary list, it is an error.

} else if {ACK=1 & FIN=1) { delete the label, original mobile IP address=SA;

previous mobile IP address=previous mobile IP address;

current mobile IP address=current IP address of the mobile;

original corresponding IP address=DA;

from the ongoing TCP connections list.

}

}

Registration and Configuration

SIP cannot support roaming. As the mobile station travels from its Home Network to a Visiting Network, the present invention uses one of two approaches to register and configure the mobile station. The first approach requires no extension and/or modifications to SIP. The second approach requires certain modifications and/or extensions to SIP.

The first approach uses three components, DHCP, SIP REGISTER and SIP INFO, to register and configure the mobile station. First, the mobile station requests a new IP address from a DHCP server. Second, the DHCP server assigns a temporary IP address to the mobile station. Third, the mobile station uses the SIP REGISTER method with its temporary IP address as CONTACT in the REGISTER method. If registration happens in the middle of an ongoing session (i.e., re-registration), then the Visiting Registrar of the Visiting Network has to authenticate the mobile station with the Home Registrar of the mobile station's Home Network.

Figure 4:
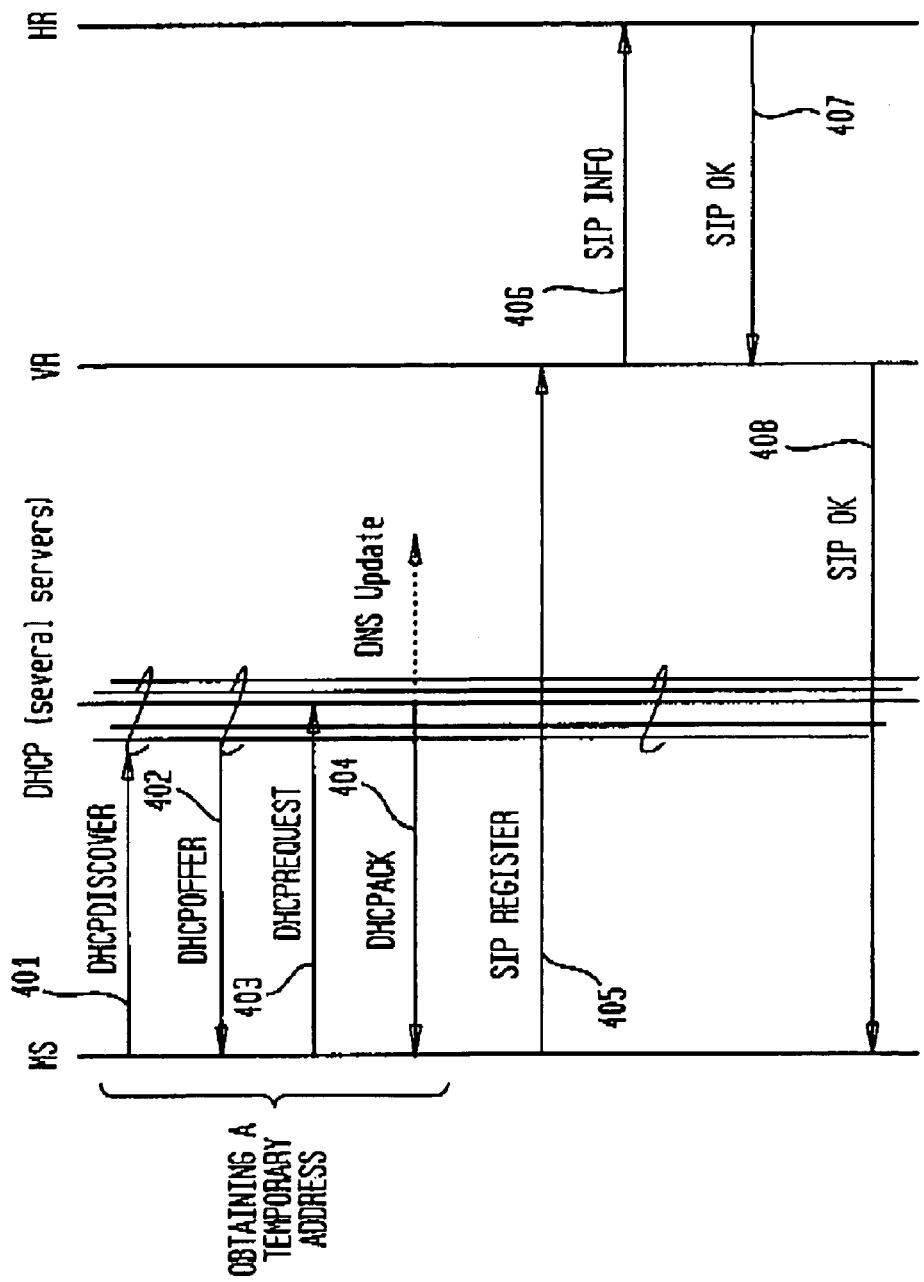
FIG. 4 illustrates the signaling flow of the first approach to registration and configuration performed by the preferred embodiment of the present invention.

FIG. 4 depicts the signaling flow for the foregoing approach to registration and configuration of the mobile station. At step 401, the mobile station (MS) broadcasts a DHCPDISCOVER message to the DHCP server within its local area. At step 402, several DHCP servers offer a new IP address to the mobile station via a DHCPOFFER message. At step 403, the mobile station selects one of these IP addresses and sends a DHCPREQUEST message to the corresponding DHCP server. At step 404, the DHCP server sends a DHCPACK message to confirm the assignment of the IP address to the mobile station. Simultaneously, the DHCP server shall update the DNS IP address to name and name to IP address mappings, preferably uses the Dynamic DNS updating mechanism (defined in RFC 2136) to perform the DNS mapping update. Here the DNS update process is not shown in detail. At step 405, the mobile station sends a SIP REGISTER message, whose CONTACT header field is set to the mobile station new IP address, to the Visiting Registrar (VR) of the Visiting Network. The SIP REGISTER message contains the service profile of the mobile station. At step 406, the Visiting Registrar of the Visiting Network uses the SIP INFO method to send the mobile station's profile to the Home Registrar (HR) of the mobile station's Home Network for authentication. At step 407, the Home Registrar responds to the Visiting Registrar with a SIP OK message if authentication is successful, otherwise, the Home Registrar responds with a SIP "603 Decline" message. Then, at step 408, the Visiting Registrar sends a SIP OK to the mobile station to confirm the mobile station's registration with the Visiting Network.

Assuming that the processing time is negligible, the maximum registration time using this approach is equal to the sum of: the round trip delays of (mobile station-DHCP-mobile station)+the round trip delays of (mobile station-Visiting Registrar-mobile station)+the round trip delays of (Visiting Registrar-Home Registrar-Visiting Registrar). The first term, (mobile-DHCP-mobile), represents the time it takes to get an IP address; and the second term, (mobile station-Visiting Registrar-mobile station), together with the third term, (Visiting Registrar-Home Registrar-Visiting Registrar) represent the time it takes to register and configure the mobile station. Accordingly, the registration and configuration time comprises the amount of time the mobile station interacts with the SIP registrar as well as the time it takes the Visiting Registrar to communicate with the Home Registrar in order to authenticate the mobile.

In order to reduce the impact of roaming on the performance of interactive real-time services, it is essential to minimize the time it takes a mobile station to register with and be configured for a Visiting Network. This can be achieved in two ways, either alone or in combination: 1) minimizing the mobile authentication time and/or 2) minimizing IP address acquisition time. The second approach to registration and configuration of a roaming mobile station, described later in this specification, is directed to an approach to minimizing IP address acquisition time.

In minimizing mobile station authentication time, mobile authentication can be expedited through replicating a mobile station's profile in networks that are most likely to be visited by the mobile. This profile replication reduces the registration time by a (Visiting Registrar-Home Registrar-Visiting Registrar) round trip.

The second approach to registration and configuration of a roaming mobile equips the SIP registrar with DHCP functions so that IP address acquisition time is reduced. Restated again here, in order to reduce the impact of roaming on the performance of interactive real-time services, it is essential to minimize the time it takes a mobile station to register with and be configured for a Visiting Network. This can be achieved in two ways, either alone or in combination: 1) minimizing the mobile authentication time and/or 2) minimizing IP address acquisition time. As previously stated, mobile authentication can be expedited through replicating a mobile station's profile in networks that are most likely to be visited by the mobile user.

With respect to reducing IP address acquisition time, realization of this approach requires the modification of the SIP REGISTER method so that if the CONTACT field is set to a default registration/hand-off (RHO) value, the SIP registrar shall request an IP address for the mobile station. The SIP registrar shall also be equipped with a DHCP client and shall be co-located with a DHCP server to also allow the SIP registrar to assign an IP address to a mobile station. Hence, the SIP registrar shall request an IP address for the mobile station and subsequently assign the proffered and accepted IP address to the mobile station.

Figure 5:
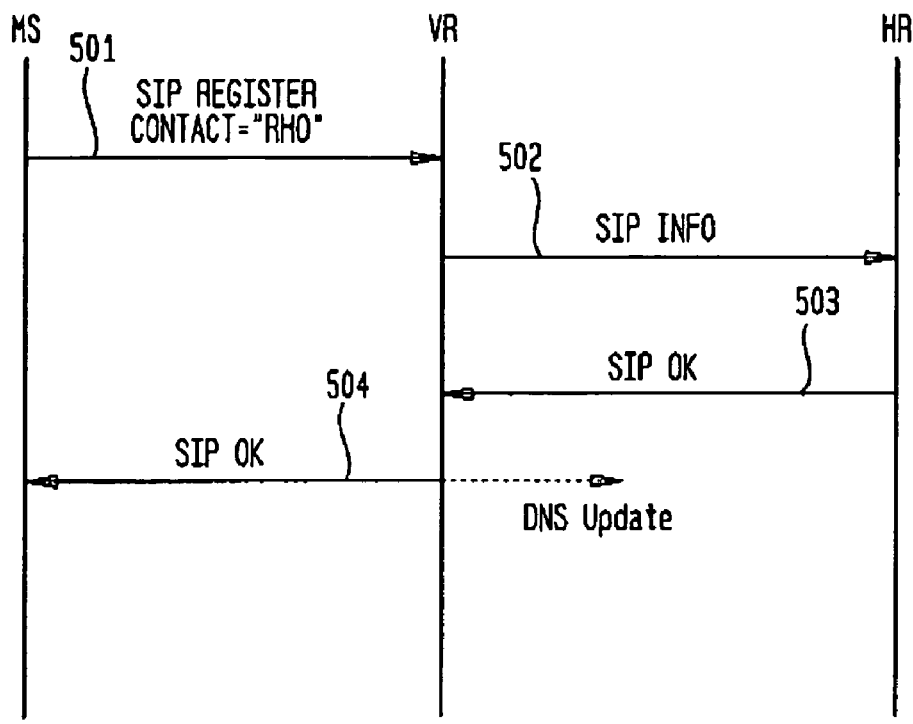
FIG. 5 illustrates the signaling flow of the second approach to registration and configuration performed by the preferred embodiment of the present invention.

FIG. 5 illustrates the signaling flow of the second approach to registration and configuration of a mobile station. At step 501, the mobile station (MS) uses the SIP REGISTER method with the CONTACT header field set to RHO to register as well as get a new IP address. At steps 502–503, when the Visiting Registrar (VR) of the Visiting Network receives this message, the Visiting Registrar assigns a new IP address to the mobile, that is, the DHCP client of the Visiting Registrar asks for an IP address from the DHCP server of the Visiting Registrar. Next, the Visiting Registrar and Home Registrar (HR) of the mobile station's Home Network interact to authenticate the mobile. If authentication fails, the Visiting Registrar sends a SIP message (e.g. "603 Decline" message) to the mobile station to decline the request. Otherwise, at step 504, the Visiting Registrar sends to the mobile station a SIP OK message along with the requested IP address and the DHCP server updates, preferably dynamically, the DNS.

Assuming negligible processing time, the maximum registration time equals the sum of the round trip (mobile station-Visiting Registrar-mobile station) and round trip (Visiting Registrar-Home Registrar-Visiting Registrar) delays. Stated again, a profile replication method may be used to eliminate the round trip delay (Visiting Registrar-Home Registrar-Visiting Registrar) involved in authentication.

The SIP registrar informs the mobile station about its new IP address exactly the way DHCP normally does. Accordingly, the TCP/IP or UDP/IP software would accept and forward (to the IP layer) any data packets delivered to the mobile station's hardware address before its IP address is configured. The SIP registrar may use the limited broadcast IP address to force the IP layer to broadcast the registrar's response on the subnet so that it is delivered to the mobile station's hardware address before the TCP(UDP)/IP software of the mobile is configured. If mobiles can accept hardware unicast datagrams before their TCP(UDP)/IP software are configured, the registrar may use this capability to deliver the mobile station's new/temporary IP address.

Mobility Support Via Dynamic Address Binding

The present invention uses/extends SIP to provide for mobility support. Mobility support involves re-invitation and tunneling via IP address binding. Mobility support primarily consists of two functions: 1) Location service, i.e., locating mobile users in response to new incoming session requests, and 2) Hand-off, i.e., ensuring soft hand-off as the mobile user roams across subnets and/or domains.

Given the situation where a mobile user has moved to a new location when a corresponding host initiates a session with the mobile station, the present invention sets up the session as follows: 1) the corresponding host invites the mobile station; 2) a SIP redirect server informs the corresponding host that the mobile station has moved to a new or temporary IP address; 3) the corresponding host re-invites the mobile station at the new IP address; and 4) a session is set up between the corresponding host and mobile station and data packet transfer between the two begins.

Figure 6:
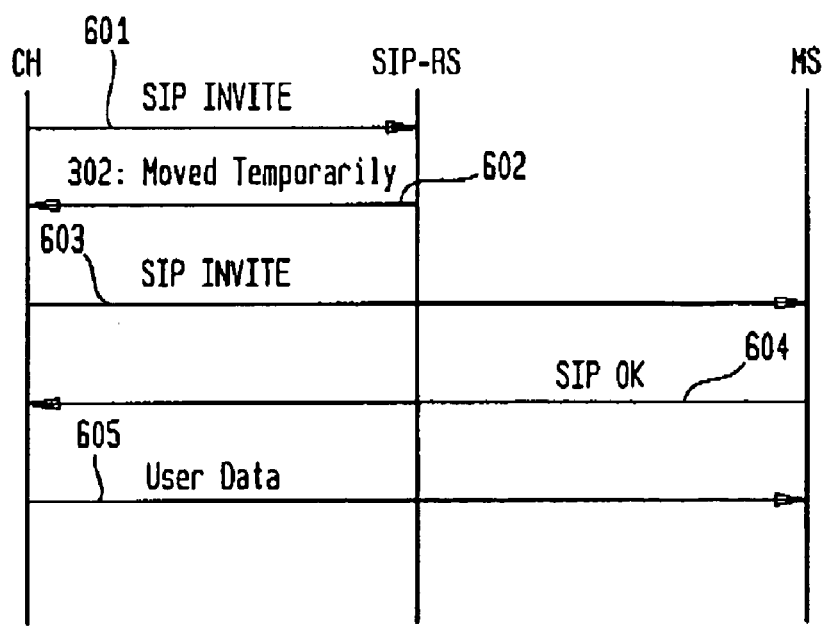
FIG. 6 illustrates the logical sequence of operations of signaling flow for location service performed by the preferred embodiment of the present invention.

FIG. 6 illustrates the signaling flow for the location service feature/function of the present invention. At step 601, the corresponding host (CH) sends a SIP INVITE message to the mobile station (MS). At step 602, a SIP Redirect Server (SIP-RS) intercepts the SIP INVITE message and sends a redirection/moved temporarily message (e.g. "302" message) to the corresponding host with the mobile station's new/temporary IP address set as the CONTACT. At step 603, the corresponding host sends a SIP INVITE message to the mobile station at the new IP address. At step 604, the mobile station responds with a SIP OK message. At step 605, data transfer between the corresponding host and mobile station begins. Since the DHCP dynamically updates the DNS mappings, new TCP connections are established using the most recent IP address of the mobile station.

The present invention also ensures a smooth hand-off when a mobile station moves to a new location during an ongoing session with a corresponding host. In doing so, the present invention re-establishes a new session between the corresponding host and the mobile station at its new location and creates a short-lived tunnel for forwarding any transient packet data generated during the hand-off to the mobile station's new location. When the mobile station moves to a new location during an ongoing session with a corresponding host, the mobile re-registers with the SIP Registrar using either of the registration methods previously described and obtains a new IP address. With a new IP address in hand, a new session with the same session ID is created between the corresponding host and the mobile station.

Figure 7:
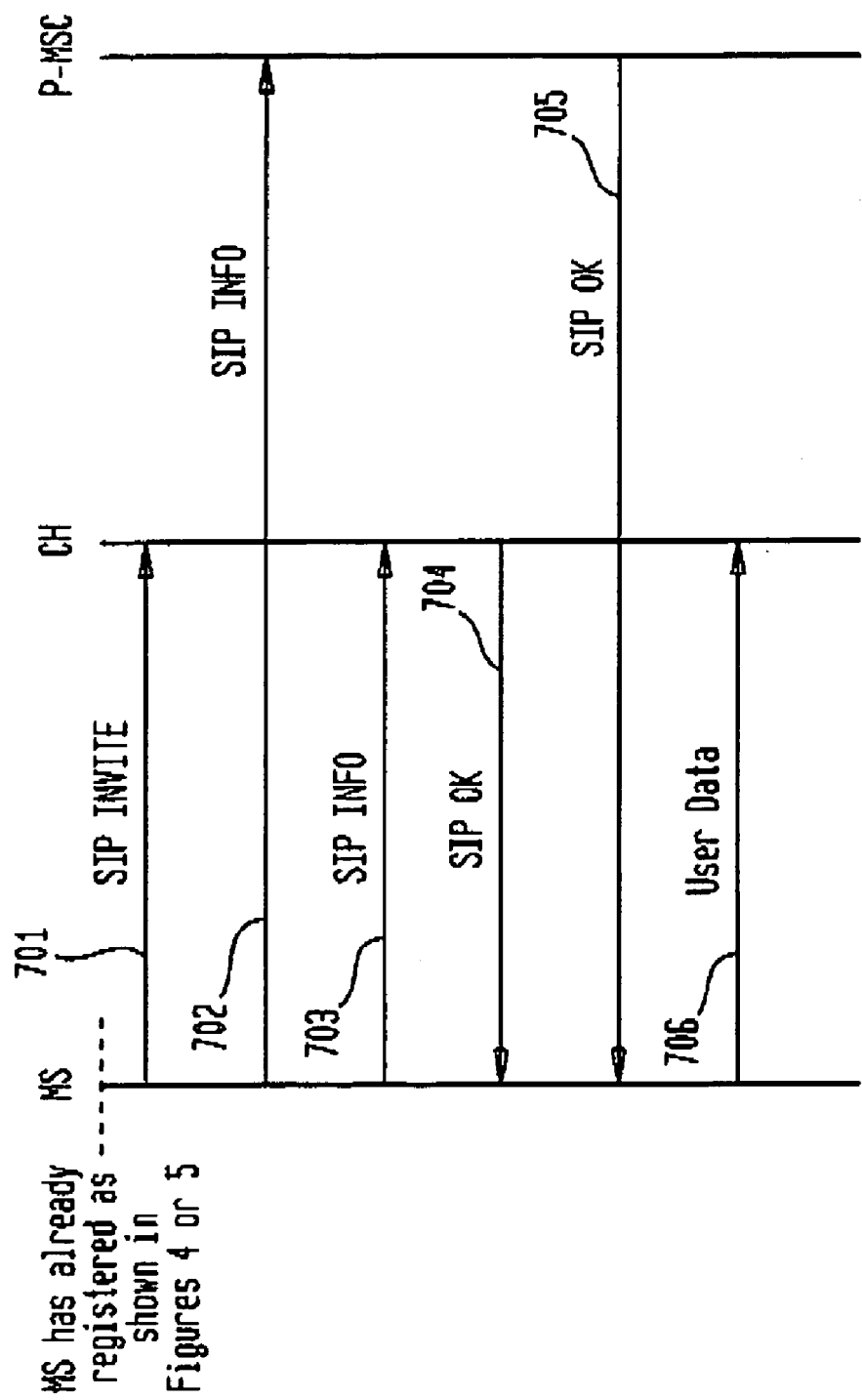
FIG. 7 illustrates the logical sequence of operations of signaling flow for hand-off performed by the preferred embodiment of the present invention.

FIG. 7 illustrates signaling flow for handoff. At step 701, in order to create a new session, the mobile station (MS) or SIP server (depending on which registration and configuration approach is used) re-invites the corresponding host (CH) to the mobile station's requests containing new IP address using SIP INVITE. At step 702, the mobile station or SIP server uses the SIP INFO message to create a short lived tunnel between the previous edge router and controller (P-ERC) and the new edge router and controller to reduce the loss of session transient data. In creating the tunnel, the mobile station or SIP server sends a SIP INFO message to the previous edge router and controller (the previous edge router and controller is the same as the default gateway of the mobile station before getting the new IP address) to bind the old IP address of the mobile station with the new IP address of the mobile station so that transient messages are forwarded to the mobile station's new IP address. The expire field of the SIP INO method is used to specify the tunnel lifetime (i.e. a time out period after which the tunnel is disconnected) Simultaneously, at step 703, the SIP-EYE Agent of the mobile station sends a first SIP INFO message to the SIP-EYE Agent of the corresponding host(s) to bind the mobile station's original host (i.e., its original IP address) to the current host (i.e., its new IP address), and a second SIP INFO message to the previous edge router and controller to bind the mobile station's previous host (i.e., its P address before hand-off) to its current host so that the transient packet data is tunneled to the mobile station's new location and loss of data is minimized. The previous edge router and controller uses IP encapsulation to create a tunnel for forwarding the transient packets to the mobile station's new location. Each edge router and controller shall also have a SIP User Agent to aid in the tunneling process.

Note: the exact sequence of SIP OK responses from the previous edge router and controller, the corresponding host's User Agent and the SIP_EYE Agent to their counterparts depend on the round trip delay between these entities as well as the network traffic these messages encounter as they traverse the network.

Method of Operation

Referring to FIGS. 8–10, an effective mobility management protocol would provide for: 1) cell hand-off (micro mobility), that is, allowing a mobile user to move from one cell to another; 2) subnet hand-off (macro mobility), that is, allowing a user to move between and among different subnets within the same administrative domain, and 3) roaming (global mobility), that is, allowing a mobile user to travel between different subnets that belong to different administrative domains. The present invention uses SIP to provide for subnet hand-off and roaming of a mobile station. Cell hand-off is not part of the present invention since it is usually handled at the link layer. Nevertheless, for completeness, what follows is a description of all three types of functionality.

Referring generally to FIGS. 8–10, consider the scenario where a mobile station 1 communicates with a corresponding host 2. The mobile station 1 will first register with its Home Registrar of its Home Network using the SIP REGISTER method. Communication between the mobile station 1 and the corresponding host 2 starts when the mobile station 1 is at location A and continues as the mobile station 1 moves along the dashed path towards location D.

Cell Hand-off

Referring to FIG. 8 A, as the mobile station moves from location A to location B, a link layer mobility management entity: 1) binds the mobile station's MAC address (or CDMA sequence) to the port within base station controller 850 that is destined for base station 865 (Step 801, FIG. 8B), and 2) updates the s label translation table of the base station controller 850 so that information or data packets destined for the mobile station 1, previously at location A, would now be re-routed to base station 865 (Step 802, FIG. 8B). Mobile station 1 is now able to simultaneously communicate with the two adjacent base stations 855 and 865 and a smooth hand off will occur because IP address binding to base station 855 is maintained for a certain time-out period after cell hand-off.

Subnet Hand-off

Figure 9B:
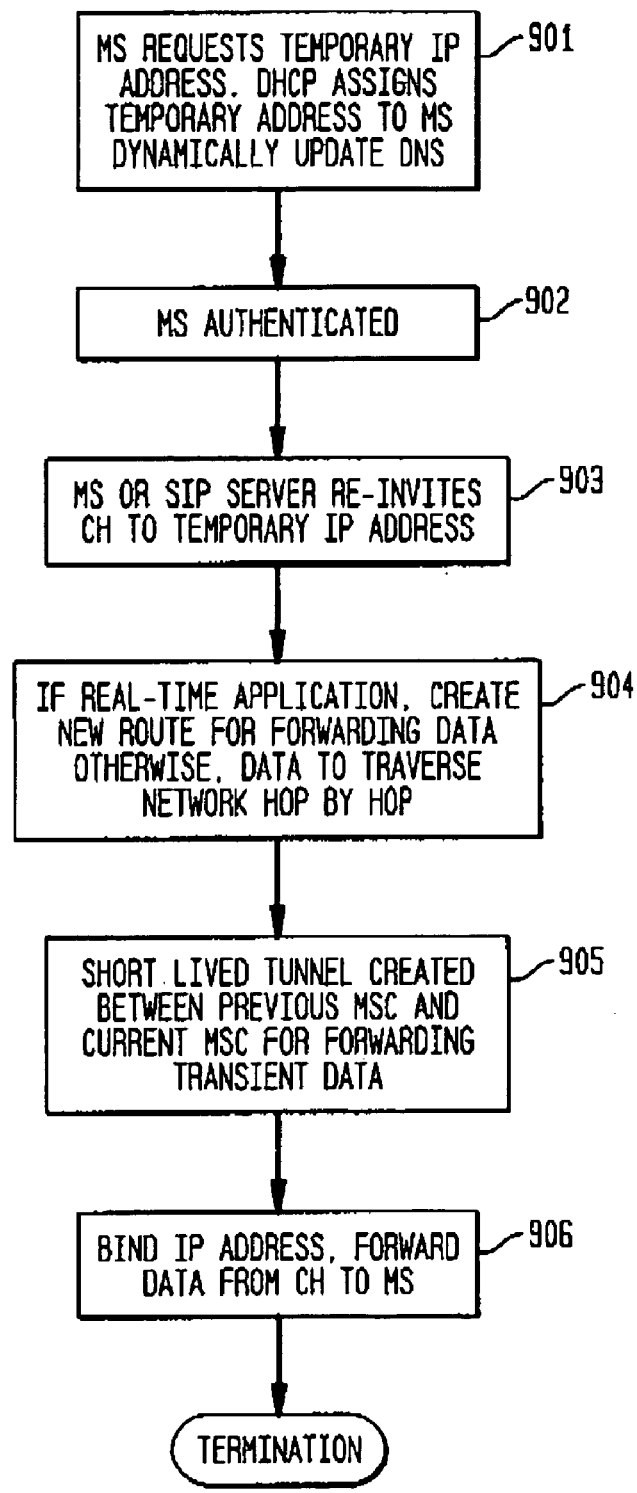

The present invention supports subnet hand-off (i.e., micro-mobility) during a communication session. Referring to FIG. 9 A, as the mobile station 1 moves from one subnet (location B) to another subnet (location C) on its Home Network, it still remains registered with its Home Network. At location C, the mobile station 1 will first request (Step 901, FIG. 9B) a new IP address from the DHCP server 922, either directly or via the SIP register 921. The DHCP server will simultaneously (Step 901, FIG. 9B): assign the mobile station 1 a temporary IP address, the IP address of the edge router and controller 946 (the default gateway), and the subnet (of location C) mask; and 2) update the domain name system (DNS) to reflect the new IP address assignment. At step 902, FIG. 9B, in public networks, the Home Network authenticates the mobile station 1 as protection against fraud. At step 903, the mobile station 1 or SIP server 921 re-invites the corresponding host 2 to the new temporary P address maintaining the same session ID. At step 904, the SIP server and network resource reservation schemes create a new route with adequate resources between the corresponding host and the mobile for real-time applications such as voice. At step 905, using the SP INFO method, a short lived tunnel is created between the previous edge router and controller 945 at location B and the current edge router and controller 946 at location C to minimize the loss of transient data due to hand-off. In creating the tunnel T, at step 906, either the mobile station 1 or SIP server informs the edge router and controller 945 at location B to bind the previous IP address of the mobile station 1 to its current IP address for a predetermined time-out period. Any transient data is thereafter forwarded through the tunnel T to the mobile station 1 at location C until the time-out period expires.

Roaming

Figure 10B:
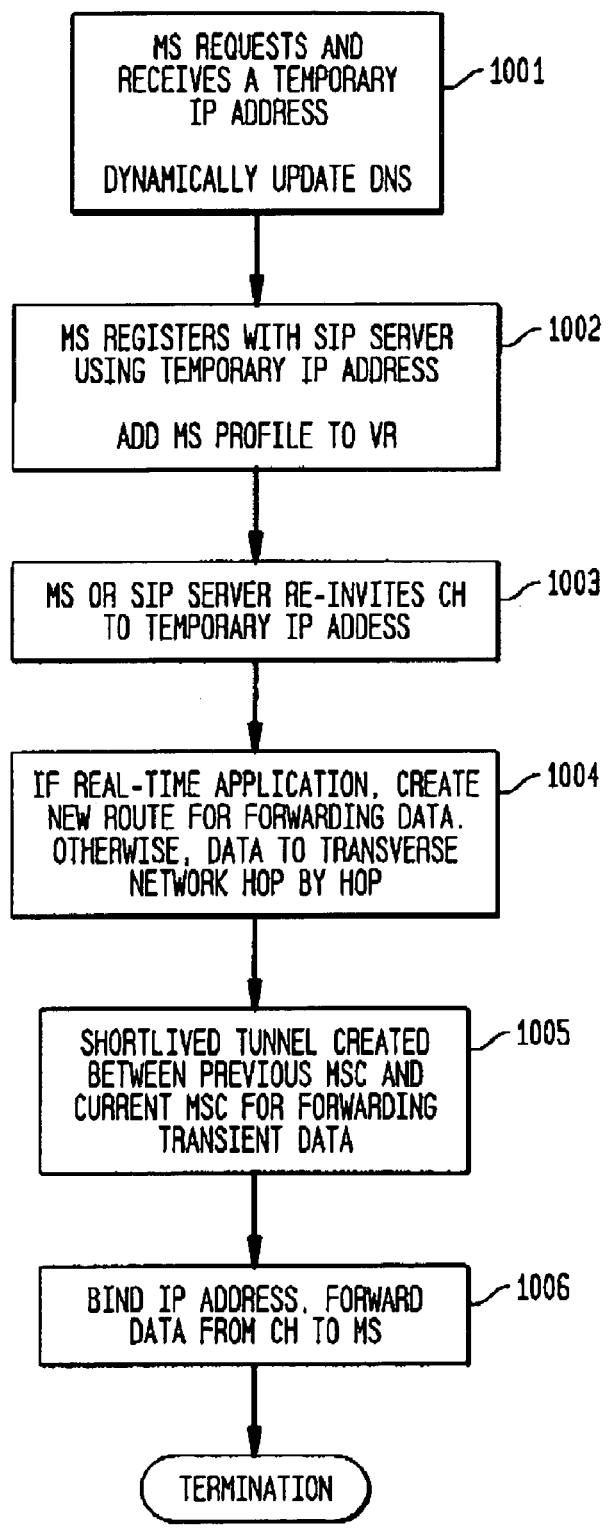

The present invention supports roaming (i.e. domain-mobility) during a communication session between a mobile station 1 and a corresponding host or hosts 2. Referring to FIG. 10 A, as the mobile station 1 moves from location C within its Home Network to location D within a Visiting Network, the present invention operates as follows: at step 1001, FIG. 10B, the mobile station 1 will request a new IP address from the DHCP server 1026 of the Visiting Network. The DHCP server 1026 will simultaneously: 1) assign the mobile station 1 a temporary address; and 2) update the domain name system (DNS) to reflect the new IP address assignment. At step 1002, the mobile station re-registers its new IP address with the SIP server 1026 using the SIP REGISTER method. Ideally, the mobile station's profile is added to the Visiting Registrar of the Visiting Network, i.e., its profile is replicated either through the interaction of the Visiting Registrar with the Home Registrar of the mobile station's Home Network, or by pre-planned profile replications in the neighboring Visiting Registrar's. The pre-planned profile replications reflect the mobility pattern of the mobile, and its effective realization requires continuous monitoring of user's mobility patterns. At step 1003, the mobile station 1 or the SIP server 1024 re-invites the corresponding host 2 to the temporary IP address. At step 1004, the SIP server and network resource reservation scheme creates a new route with adequate resources between the corresponding host and the mobile for real-time applications such as voice. Non-real-time applications are allowed to traverse the networks hop-by-hop. At step 1005, a short-lived tunnel T is created between the previous edge router and controller 1046 at location C and the edge router and controller 1040 at location D to reduce loss of transient information due to hand off. In creating the tunnel T, at step 1006, the mobile station 1 or SIP server 1024 informs the edge router and controller 1046 at location C to bind the previous IP address of the mobile station 1 to its current IP address for a predetermined time-out period. (Note: This requires SIP User Agents at all edge router and controllers (i.e., subnet routers), and the IP address of the most recent edge router and controller (the most recent default gateway.)) Any transient data is thereafter forwarded through the tunnel T to the mobile station 1 at location D until the time-out period expires.

In summary, the requirements for supporting hand-off are the following: 1) the SIP User Agent shall be equipped with a SIP_EYE Agent that tracks TCP connection; 2) the SIP_EYE Agent shall maintain a state comprising the <original mobile IP address, previous mobile IP address, current mobile IP address, original corresponding IP address> per TCP connection; 3) the SIP User Agent shall keep the IP address of the last default gateway (i.e., previous ERC before hand-off); 4) the SIP User Agent shall understand IP address binding INFO messages and take necessary actions; 5) the SIP INFO method shall support IP address bindings, i.e., understand a "Bind [address1] to [address2]" instruction in the method message body.

Having now described a preferred embodiment of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, and equivalents or similar purpose, unless expressly stated otherwise. Therefore, numerous other embodiments of the modifications thereof are contemplated as falling within the scope of the present invention as defined by the appended claims and equivalents thereto.

What is claimed is:

1. A method for monitoring and tracking all TCP connections of a mobile station in a SIP-compliant network having a plurality of nodes and mobile stations, said method comprising the steps of a SIP-EYE agent:

monitoring session set-up and disconnect messages of said TCP connections, and creating and keeping a data structure for each of said TCP connections for the mobile station, each data structure comprising:

(a) an original IP address of said mobile station, (b) a previous IP address of said mobile station, (c) a current IP address of said mobile station, and (d) and original IP address of a corresponding host node;

wherein said original IP address of said mobile station is the IP address of said mobile station at the beginning of the TCP connection, said previous IP address of said mobile station is the last address just before the current IP address of said mobile station and, said original IP address of said corresponding host node is the IP address of said corresponding host node at the beginning of the TCP connection; and using said data structure by said SIP-EYE agent to monitor and track connections in said TCP network.

* * * * *

UNITED STATES PATENT AND TRADEMARK OFFICE
CERTIFICATE OF CORRECTION

PATENT NO. : 7,184,418 B1  
APPLICATION NO. : 09/693019  
DATED : February 27, 2007  
INVENTOR(S) : Baba et al.

It is certified that error appears in the above-identified patent and that said Letters Patent is hereby corrected as shown below:

In the Specification

In Column 2, Line 9, delete "(e.g." and insert -- (e.g., --, therefor.

In Column 4, Line 8, delete "update. 2xx" and insert -- update, 2xx --, therefor.

In Column 4, Line 11, delete "SDIP" and insert -- SIP --, therefor.

In Column 4, Line 29, delete "session." and insert -- session, --, therefor.

In Column 4, Lines 32-33, delete "description." and insert -- description, --, therefor.

In Column 4, Line 39, delete "begins:" and insert -- begins. --, therefor.

In Column 5, Line 52, delete "Agent The" and insert -- Agent. The --, therefor.

In Column 9, Line 13, delete "See" and insert -- see --, therefor.

In Column 13, Line 36, delete "(e.g." and insert -- (e.g., --, therefor.

In Column 14, Line 1, delete "(P-ERC)" and insert -- (IP-ERC) --, therefor.

In Column 14, Line 10, delete "INO" and insert -- INFO --, therefor.

In Column 14, Line 11, delete "(i.e." and insert -- (i.e., --, therefor.

In Column 14, Line 12, delete "disconnected) Simultaneously," and insert -- disconnected). Simultaneously, --, therefor.

In Column 14, Line 18, delete "P" and insert -- IP --, therefor.

In Column 15, Line 22, delete "P" and insert -- IP --, therefor.

Signed and Sealed this  
Ninth Day of December, 2014

Michelle K. Lee  
*Deputy Director of the United States Patent and Trademark Office*

CERTIFICATE OF CORRECTION (continued)
U.S. Pat. No. 7,184,418 B1

In Column 15, Line 27, delete "SP INFO" and insert -- SIP INFO --, therefor.

In the Claims

In Column 16, Line 61, in Claim 1, delete "station and," and insert -- station, and --, therefor.